US009424510B2

(12) United States Patent
Huang et al.

(10) Patent No.: US 9,424,510 B2
(45) Date of Patent: Aug. 23, 2016

(54) ADAPTIVE FUZZY RULE CONTROLLING SYSTEM FOR SOFTWARE DEFINED STORAGE SYSTEM FOR CONTROLLING PERFORMANCE PARAMETER

(71) Applicant: ProphetStor Data Services, Inc., Taichung (TW)

(72) Inventors: Ming Jen Huang, Taichung (TW); Chun Fang Huang, Taichung (TW); Tsung Ming Shih, Taichung (TW); Wen Shyen Chen, Taichung (TW)

(73) Assignee: Prophetstor Data Services, Inc., Taichung (TW)

( * ) Notice: Subject to any disclaimer, the term of this patent is extended or adjusted under 35 U.S.C. 154(b) by 302 days.

(21) Appl. No.: 14/283,377

(22) Filed: May 21, 2014

(65) Prior Publication Data
US 2015/0339587 A1    Nov. 26, 2015

(51) Int. Cl.
*G06N 3/04* (2006.01)
(52) U.S. Cl.
CPC .................................. *G06N 3/0436* (2013.01)
(58) Field of Classification Search
CPC .................................................. G06N 3/0436
See application file for complete search history.

(56) References Cited

U.S. PATENT DOCUMENTS

| 6,446,054 B1 * | 9/2002 | Mayorga Lopez ..... B25J 9/1607 706/2 |
| 2015/0071123 A1 * | 3/2015 | Sabaa ................. H04L 67/1004 370/255 |

OTHER PUBLICATIONS

Fuzzy Controled QoS for Scalable Cloud Computing Services; Cloud Computing 2013 : The Fourth International Conference on Cloud Computing, GRIDs, and Virtualization; Stefan Frey et al.

* cited by examiner

*Primary Examiner* — Stanley K Hill
*Assistant Examiner* — Ola Olude-Afolabi
(74) *Attorney, Agent, or Firm* — Che-Yang Chen; Law Offices of Michael Chen

(57) ABSTRACT

An adaptive fuzzy rule controlling system for a software defined storage (SDS) system to control performance parameters in a storage node is disclosed. The system includes: a traffic monitoring module, for acquiring observed values of performance parameters in the storage node; an adaptive neural fuzzy inference module, for learning a dynamic relationship between configurations of a plurality of storage devices in the storage node and the performance parameters during a period of time, and outputting fuzzy rules which is built according to the dynamic relationship; a traffic forecasting module, for providing forecasted values of the performance parameters in a particular point in time in the future; and a fuzzy rule control module, for arranging the configuration of the storage devices in the storage node in the particular point in time in the future according to the fuzzy rules and the forecasted values.

15 Claims, 9 Drawing Sheets

| Percentage of SSD | | Throughput | | |
|---|---|---|---|---|
| | | Low Level | Medium Level | High Level |
| | Low Level | Low Level (Rule 1) | Medium Level (Rule 2) | Medium Level (Rule 3) |
| | Medium Level | Medium Level (Rule 4) | Medium Level (Rule 5) | High Level (Rule 6) |
| IOPS | High Level | High Level (Rule 7) | High Level (Rule 8) | High Level (Rule 9) |

Fig. 6

| | A | T | A*T |
|---|---|---|---|
| A1 | 0.5*5*0.33=0.825 | 20+0.67*5=23.35 | 19.26375 |
| A2 | 42.5*0.33=14.025 | 27.5+0.5*42.5=48.75 | 683.71875 |
| A3 | 0.5*5*0.17=0.425 | 67.5+0.67*5=70.85 | 30.11125 |
| A4 | 0.5*30=15 | 70+15=85 | 1275 |
| Sum | 30.275 | | 2008.09375 |

Percentage of SSD = 2008.09375/30.275=66%

T: Centroid Location from 0 of the Horizontal Axis

Fig. 9

ADAPTIVE FUZZY RULE CONTROLLING SYSTEM FOR SOFTWARE DEFINED STORAGE SYSTEM FOR CONTROLLING PERFORMANCE PARAMETER

FIELD OF THE INVENTION

The present invention relates to a fuzzy rule controlling system for software defined storage. More particularly, the present invention relates to a fuzzy rule controlling system for software defined storage to control specified performance parameters required by Service Level Agreement (SLA).

BACKGROUND OF THE INVENTION

Cloud services had been very popular in the recent decade. Cloud services are based on cloud computing to provide associated services or commodities without increasing burden on client side. Cloud computing involves a large number of computers connected through a communication network such as the Internet. It relies on sharing of resources to achieve coherence and economies of scale. At the foundation of cloud computing is the broader concept of converged infrastructure and shared services. Among all the shared services, memory and storage are definitely the two having maximum demand. This is because some hot applications, such as video streaming, require huge quantity of data to be stored. Management of memories and storages while the cloud services operate is very important to maintain normal service quality for the clients.

For example, a server used for providing cloud services usually manages or links to a number of Hard Disk Drives (HDDs). Clients access the server and data are read from or written to the HDDs. There are some problems, e.g. latency of response, due to limitation of the HDD system. Under normal operation of HDD system, the latency is usually caused by requirements of applications (i.e. workload), as the required access speed is higher than that the HDD system can support. Thus, the HDD system is a bottleneck to the whole system for the cloud service and reaches beyond the maximum capacity it can provide. Namely, the Input/output Operations Per Second (IOPS) of the HDD system cannot meet the requirements. For this problem, it is necessary to remove or reduce the workload to achieve and improve the efficiency of the server. In practice, partial of the workload can be shared by other servers (if any) or other HDDs are automatically or manually added on-line to support current HDDs. No matter which one of the above methods is used to settle the problem, its cost is to reserve a huge amount of HDDs for unexpected operating condition and necessary power consumption for the extra hardware. From an economic point of view, it is not worthy doing so. However, the shortest latency or minimum IOPS may be contracted in Service Level Agreement (SLA) and has to be practiced. For operators which have limited capital to maintain the cloud service, how to reduce the cost is an important issue.

It is worth noting that workload of the server (HDD system) more or less can be predicted in a period of time in the future based on historical records. Possibly, a trend of development of the requirement for the cloud service can be foreseen. Therefore, reconfiguration of the HDDs in the HDD system can be performed to meet the workload with minimum cost. However, a machine is not able to learn how and when to reconfigure the HDDs. In many circumstances, this job is done by authorized staff according to real time status or following stock schedule. Performance may not be very good.

Another increasing demand as well as the cloud service is software defined storage. Software defined storage refers to computer data storage technologies which separate storage hardware from the software that manages the storage infrastructure. The software enabling a software defined storage environment provides policy management for feature options, such as deduplication, replication, thin provisioning, snapshots, and backup. With software defined storage technologies, there are several prior arts providing solutions to the aforementioned problem. For example, in US Patent Application No. 20130297907, a method for reconfiguring a storage system is disclosed. The method includes two main steps: receiving user requirement information for a storage device and automatically generating feature settings for the storage device from the user requirement information and a device profile for the storage device; and using the feature settings to automatically reconfigure the storage device into one or more logical devices having independent behavioral characteristics. Throughout the text of the application, it points out a new method to reconfigure storage devices by the concept of software defined storage. The method and system according to the application can also allow users to dynamically adjust configuration of the one or more logical devices to meet the user requirement information with more flexibility. However, the application doesn't disclose how the feature settings are generated. Meanwhile, the feature settings can't be changed according to the change of different applications (i.e. workload).

Therefore, the present invention discloses a new system to implement configuration for a software defined storage so as to settle the problems mentioned above. It utilizes an adaptive fuzzy rule control and operates without human intervention. By applying the present invention, a configuration of storage devices fulfilling any workload can be calculated dynamically. Reconfiguration of the storage devices can be done in the particular point in time in the future.

SUMMARY OF THE INVENTION

This paragraph extracts and compiles some features of the present invention; other features will be disclosed in the follow-up paragraphs. It is intended to cover various modifications and similar arrangements included within the spirit and scope of the appended claims.

According to an aspect of the present invention, An adaptive fuzzy rule controlling system for a software defined storage (SDS) system to control performance parameters in a storage node includes: a traffic monitoring module, for acquiring observed values of performance parameters in the storage node; an adaptive neural fuzzy inference module, for learning a dynamic relationship between configurations of a plurality of storage devices in the storage node and the performance parameters during a period of time, and outputting fuzzy rules which is built according to the dynamic relationship; a traffic forecasting module, for providing forecasted values of the performance parameters in a particular point, in time in the future; and a fuzzy rule control module, for arranging the configuration of the storage devices in the storage node in the particular point in time in the future according to the fuzzy rules and the forecasted values so that a specified value of one specified performance parameter can be achieved in the particular point in time in the future. The storage node is operated by SDS software.

Preferably, the performance parameters comprise Input/output Operations Per Second (IOPS), latency, and throughput. The adaptive neural fuzzy inference module generates a plurality of membership functions, each for defining degrees of one performance parameter or the configuration of the storage device at a specified level. The fuzzy rule links one membership function for the performance parameter at one specified level to one membership function for the configuration of the storage devices at another specified level. A fuzzy inference is used to obtain the configuration of the storage devices with at least one given performance parameter by the degrees defined by the membership functions. The fuzzy inference is Mamdani inference or Sugeno inference. The adaptive neural fuzzy inference module further checks a difference value between the specified value of the specified performance parameter and the observed value of the specified performance parameter.

According to the present invention, the adaptive neural fuzzy inference module learns new fuzzy rules and membership functions if the difference value is over a tolerance value. The period of time ranges from tens of seconds to a period of the historical records. The observed values in the period of time are not continuously recorded. Learning the dynamic relationship is achieved by Neural Network Algorithm. The specified value is requested by a Service Level Agreement (SLA) or a Quality of Service (QoS) requirement. The storage devices are Hard Disk Drives (HDDs), Solid State Drives, Random Access Memories (RAMs) or a mixture thereof. The configuration is percentages of different types of storage devices or a fixed quantity of storage devices of single type in use. The traffic monitoring module, adaptive neural fuzzy inference module, traffic forecasting module or fuzzy rule control module is hardware or software executing on at least one processor in the storage node.

BRIEF DESCRIPTION OF THE DRAWINGS

FIG. 6 lists fuzzy rules used by the adaptive fuzzy rule controlling system.

FIG. 9 lists calculating steps for the percentage of SSD based on the sub-areas.

DETAILED DESCRIPTION OF THE PREFERRED EMBODIMENT

The present invention will now be described more specifically with reference to the following embodiment.

Figure 1:
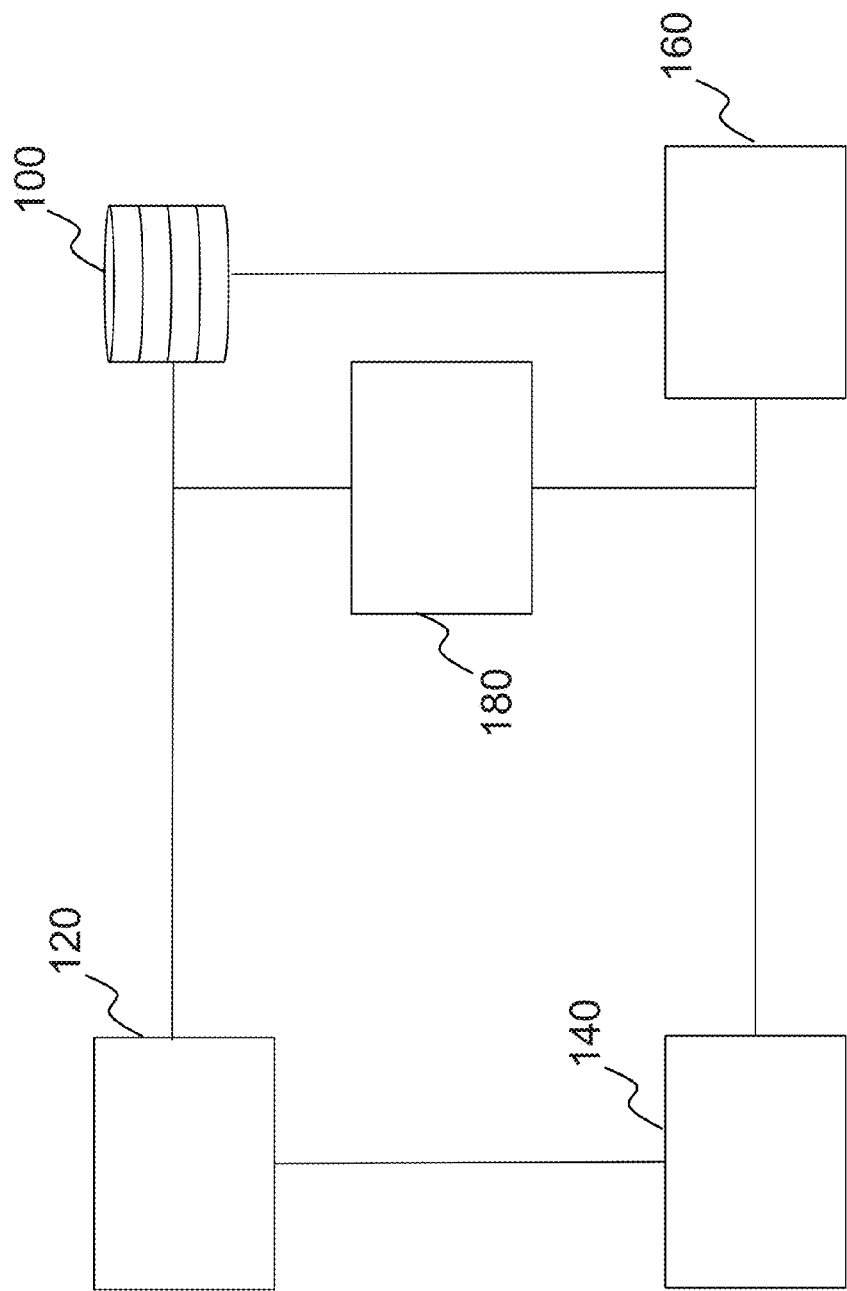
FIG. 1 illustrates a block diagram of an adaptive fuzzy rule controlling system in an embodiment according to the present invention.

Please refer to FIG. 1 to FIG. 9. An embodiment according to the present invention is disclosed. FIG. 1 is a block diagram of an adaptive fuzzy rule controlling system 10. The system 10 can be used to control performance parameters within an acceptable range for a software defined storage (SDS) system in a network. In the embodiment, the performance parameters include Input/output Operations Per Second (IOPS), latency, and throughput. The network may be internet. Thus, the storage node 100 may be a database server managing a number of storages and providing cloud services to clients. It may also be a file server or a mail server with storages for private use. The network can thus be a Local Area Network (LAN) for a lab or a Wide Area Network (WAN) for a multinational enterprise, respectively. Application of the storage node 100 is not limited by the present invention. However, the storage node 100 must be a SDS. In other words, the hardware (storage devices) of the storage node 100 should be separated from the software which manages the storage node 100. The storage node 100 is operated by SDS software. Hence, reconfiguration of the storage devices in the storage node 100 can be available by individual software or hardware.

Figure 2:
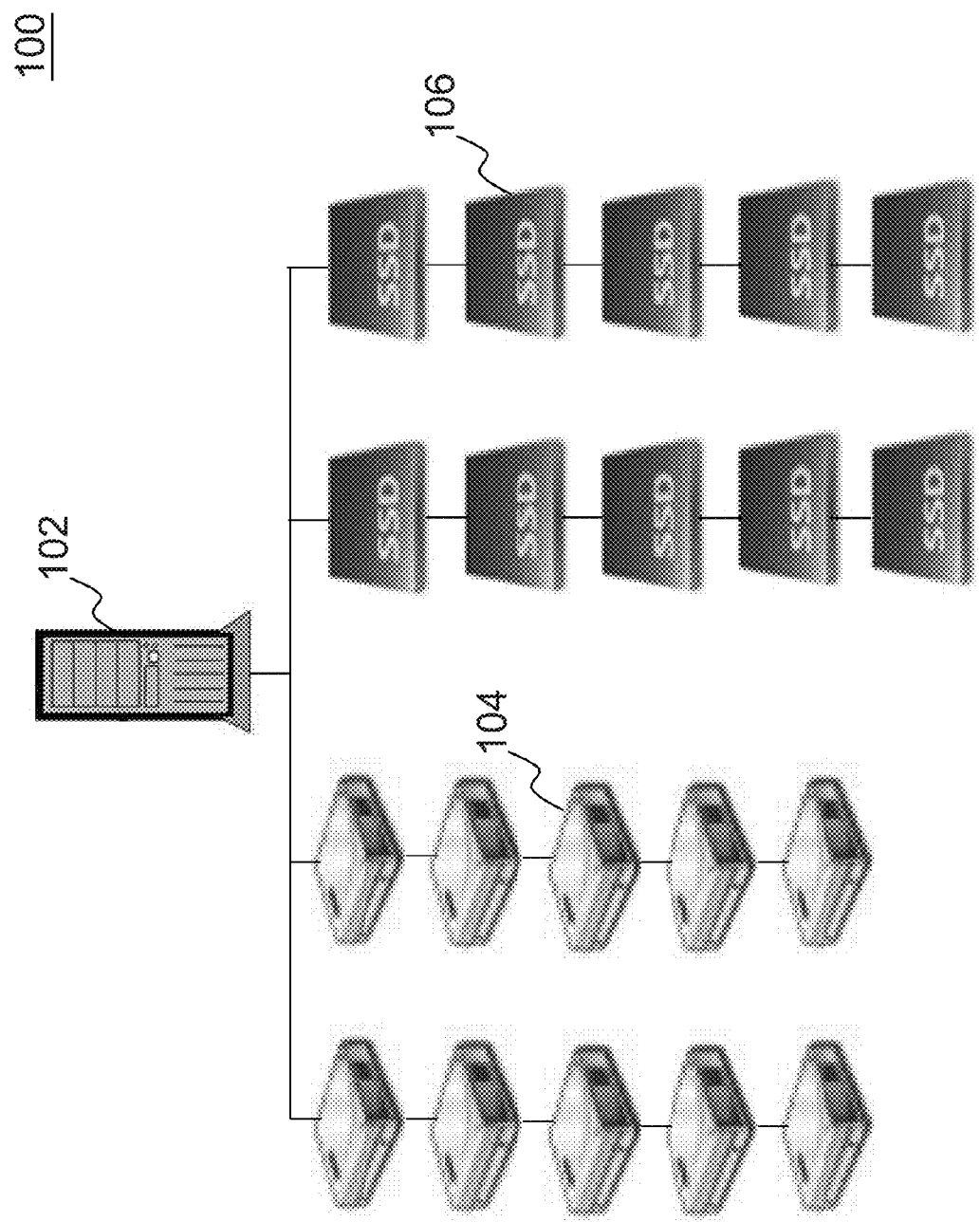
FIG. 2 shows an architecture of a storage node.

Please see FIG. 2. FIG. 2 shows the architecture of the storage node 100. The storage node 100 includes a managing server 102, 10 HDDs 104 and 10 SSDs 106. The managing server 102 can receive commands to processes reconfiguration of the HDDs 104 and SSDs 106. Different configuration of storage node 100, the percentages of the HDDs 104 and SSDs 106 in use, can maintain a certain value of latency under different workload. The SSD 106 has faster storage speed than the HDD 104. However, cost of the SSD 106 is much expensive than that of HDD 104 for similar capacity. Normally, storage capacity of the HDD 104 is around ten times as that of the SSD 106. It is not economic for such storage node 100 to provide the service with all SSDs 106 standby because life cycles of the SSDs 106 will drop very fast and storage capacity will soon become a problem when the SSDs 106 are almost fully utilized. When the configuration of the storage node 100 contains some HDDs 104 and SSDs 106, as long as the value of latency can fulfill the request in a Service Level Agreement (SLA) or a Quality of Service (QoS) requirement, the storage node 100 can still run well and avoid the aforementioned problems.

The adaptive fuzzy rule controlling system 10 includes a traffic monitoring module 120, an adaptive neural fuzzy inference module 140, a traffic forecasting module 160 and a fuzzy rule control module 180. The traffic monitoring module 120 is used to acquire Observed values of the performance parameters in the storage node 100. The adaptive neural fuzzy inference module 140 can learn a dynamic relationship between configurations of the storage devices in the storage node 100 and the performance parameters during a period of time and output fuzzy rules which are built according to the dynamic relationship. Here, a specified value of the latency is the request in the SLA or QoS. It is the maximum latency the storage node 100 should perform for the service it provides under normal use (not in booting of the storage node 100 or under very huge workload). For this embodiment, the specified value of the latency is 2 seconds. Any specified value is possible. It is not limited by the present invention. In addition, the period of time ranges from tens of seconds to a period of historical records. Thus, the adaptive neural fuzzy inference module 140 can have sufficient data for learning and analyzing. In practice, the observed values in the period of time may be not continuously recorded. It means the adaptive neural fuzzy inference module 140 would learn the dynamic relationship with data from different time segments. Learning the dynamic relationship may be achieved by many methods. In the present embodiment, Neural Network Algorithm is applied.

The adaptive neural fuzzy inference module 140 generates a number of membership functions. The membership function is used to define degrees of one performance parameter or the configuration of the storage device at a specified level. The fuzzy rule links one membership function for the performance parameter at one specified level to one membership function for the configuration of the storage devices at one specified level. Please refer to FIG. 3 to FIG. 5. These figures are used to describe the membership functions and fuzzy rules in the present embodiment.

Figure 3:
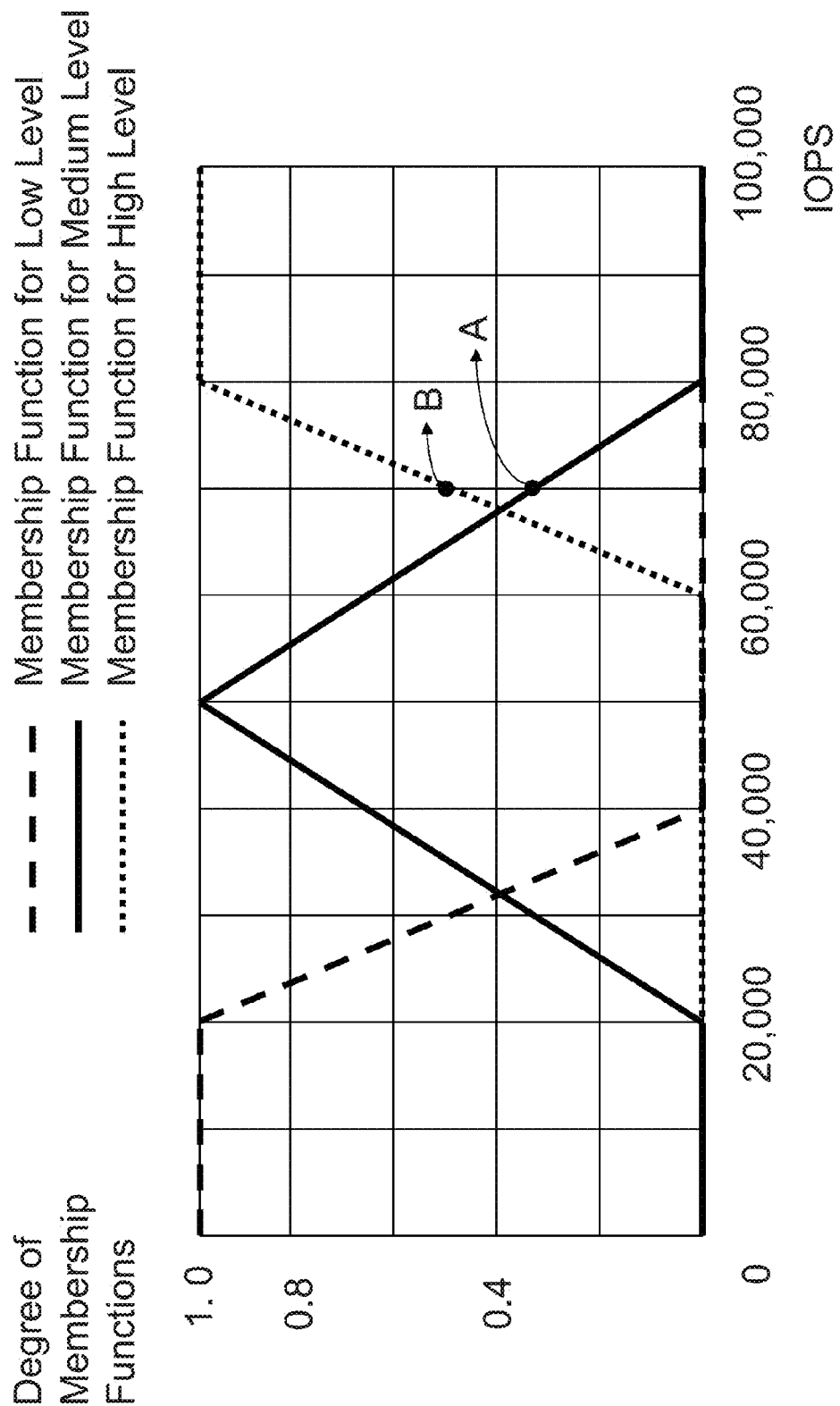
FIG. 3 illustrates membership functions for Input/output Operations per Second (IOPS).

FIG. 3 illustrates membership functions for IOPS. According to fuzzy logic, variables may have a truth value that ranges in degree between 0 and 1. Fuzzy logic has been extended to handle the concept of partial truth, where the truth value may range between completely true and completely false. Hence, the membership function describing the degree of IOPS at low level is 1.0 when IOPS is greater than or equal to 0 but smaller than 20,000, 1.0 descending to 0 linearly when IOPS is greater than or equal to 20,000 but smaller than 40,000, and 0 when IOPS is greater than or equal to 40,000 but smaller than or equal to 100,000. Similarly, the membership function describing the degree of IOPS at medium level is 0 when IOPS is greater than or equal to 0 but smaller than 20,000, 0 ascending to 1.0 linearly when IOPS is greater than or equal to 20,000 but smaller than 50,000, 1.0 descending to 0 linearly when IOPS is greater than or equal to 50,000 but smaller than 80,000, and 0 when IOPS is greater than or equal to 80,000 but smaller than or equal to 100,000. The membership function describing the degree of IOPS at high level is 0 when IOPS is greater than or equal to 0 but smaller than 60,000, 0 ascending to 1.0 linearly when IOPS is greater than or equal to 60,000 but smaller than 80,000, and 1.0 when IOPS is greater than or equal to 80,000 but smaller than or equal to 100,000.

Figure 4:
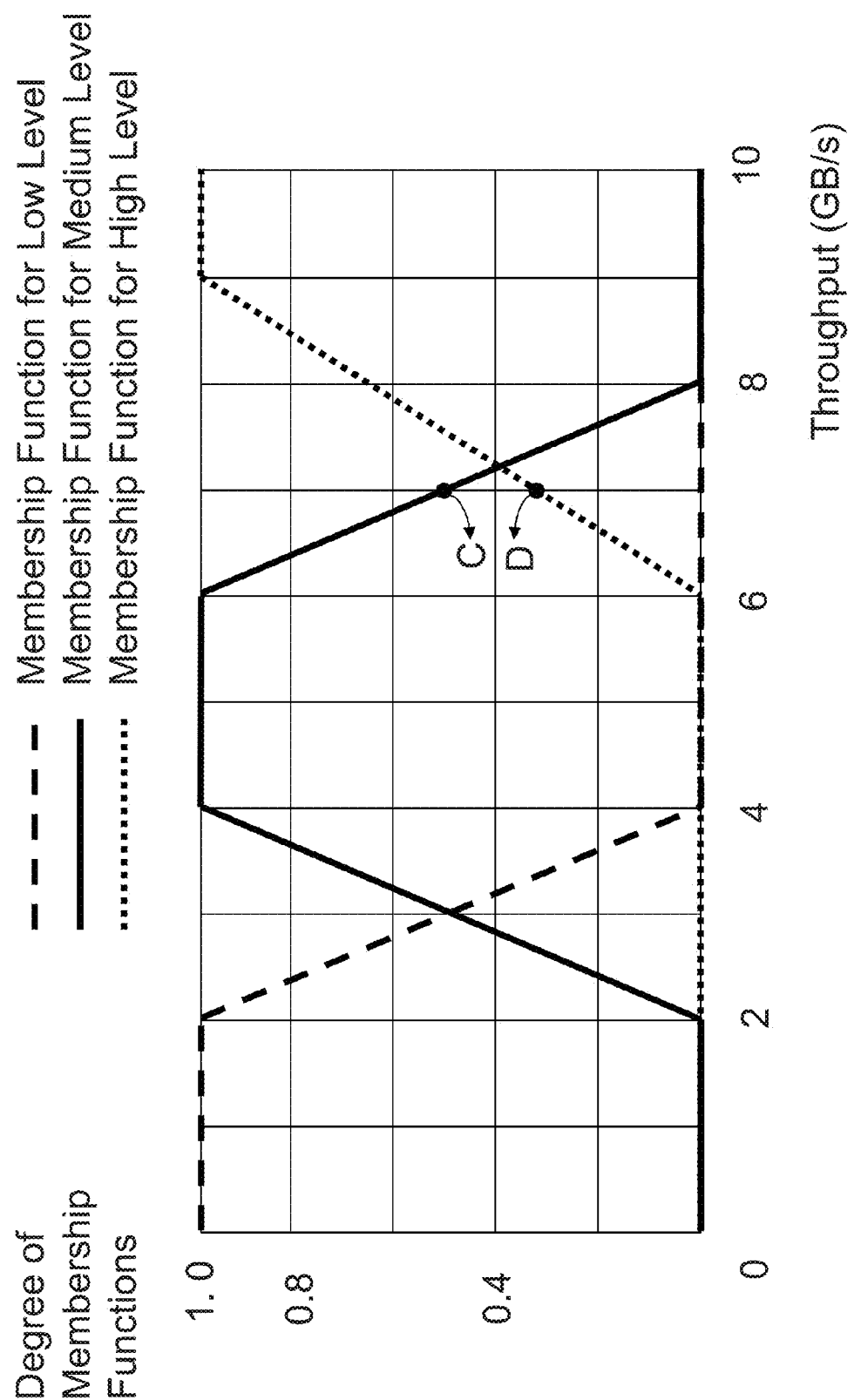
FIG. 4 illustrates membership functions for throughput.

FIG. 4 illustrates membership functions for throughput. The membership function describing the degree of throughput at low level is 1.0 when throughput is greater than or equal to 0 GB/s but smaller than 2 GB/s, 1.0 descending to 0 linearly when throughput is greater than or equal to 2 GB/s but smaller than 4 GB/s, and 0 when throughput is greater than or equal to 4 GB/s but smaller than or equal to 10 GB/s. Similarly, the membership function describing the degree of throughput at medium level is 0 when throughput is greater than or equal to 0 GB/s but smaller than 2 GB/s, 0 ascending to 1.0 linearly when throughput is greater than or equal to 2 GB/s but smaller than 4 GB/s, 1.0 when throughput is greater than or equal to 4 GB/s but smaller than 6 GB/s, 1.0 descending to 0 linearly when throughput is greater than or equal to 6 GB/s but smaller than 8 GB/s, and 0 when throughput is greater than or equal to 8 GB/s but smaller than or equal to 10 GB/s. The membership function describing the degree of throughput at high level is 0 when throughput is greater than or equal to 0 GB/s but smaller than 6 GB/s, 0 ascending to 1.0 linearly when throughput is greater than or equal to 6 GB/s but smaller than 9 GB/s, and 1.0 when throughput is greater than or equal to 9 GB/s but smaller than or equal to 10 GB/s.

Figure 5:
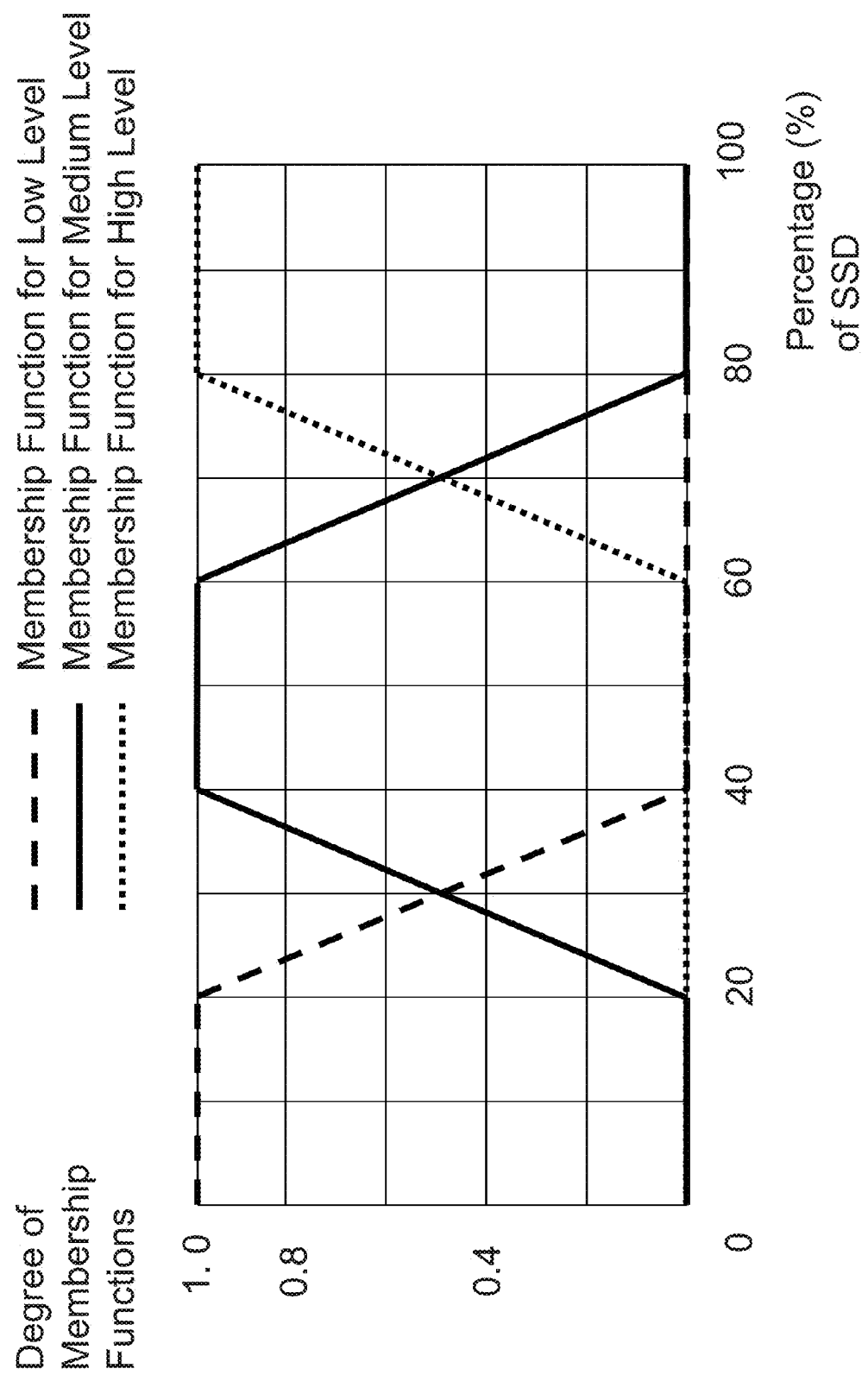
FIG. 5 illustrates membership functions for percentage of Solid-State Drives (SSDs).
Figure 7:
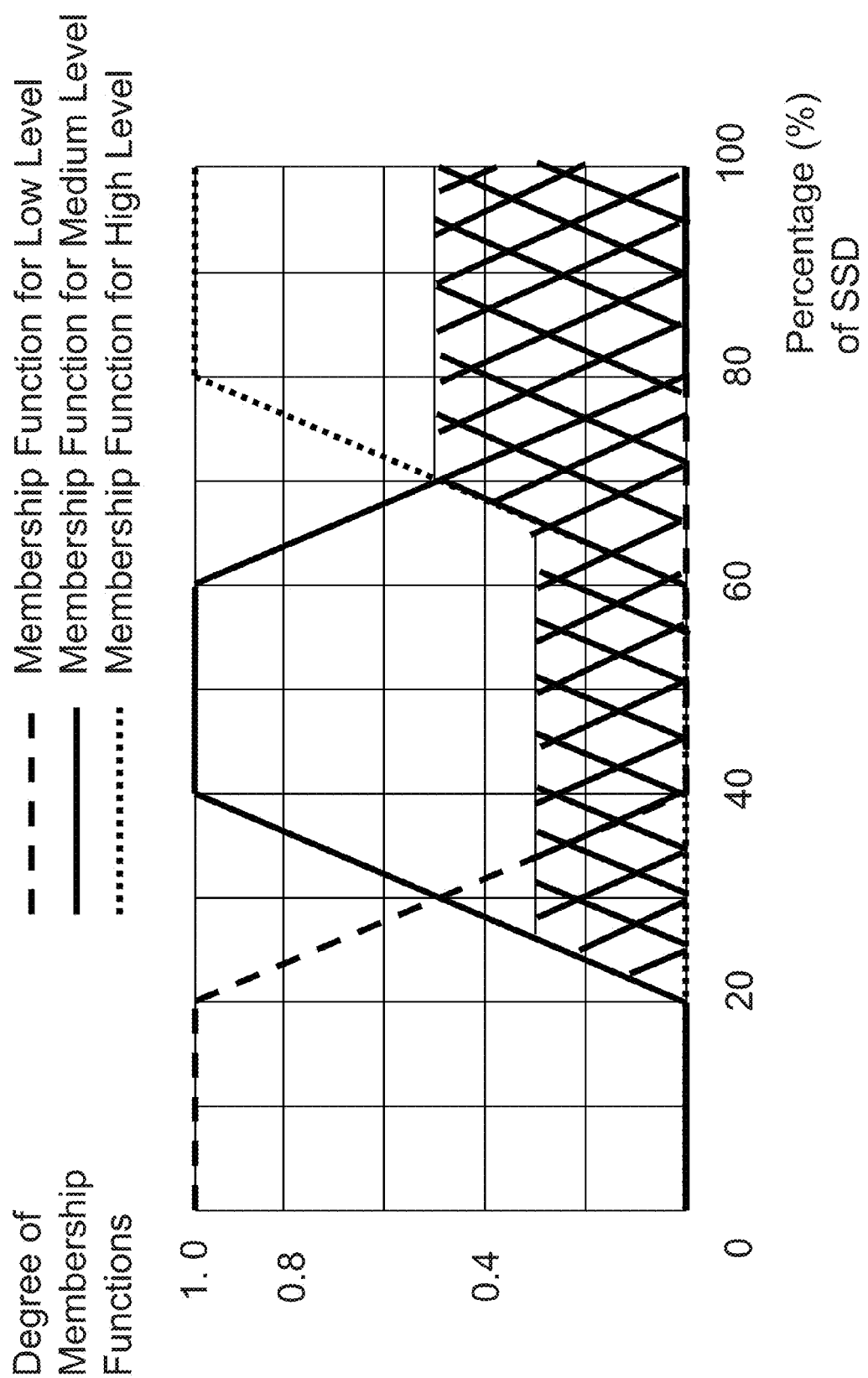
FIG. 7 shows an area for calculating a percentage of SSD when IOPS is 70,000 and throughput is 7 GB/s.
Figure 8:
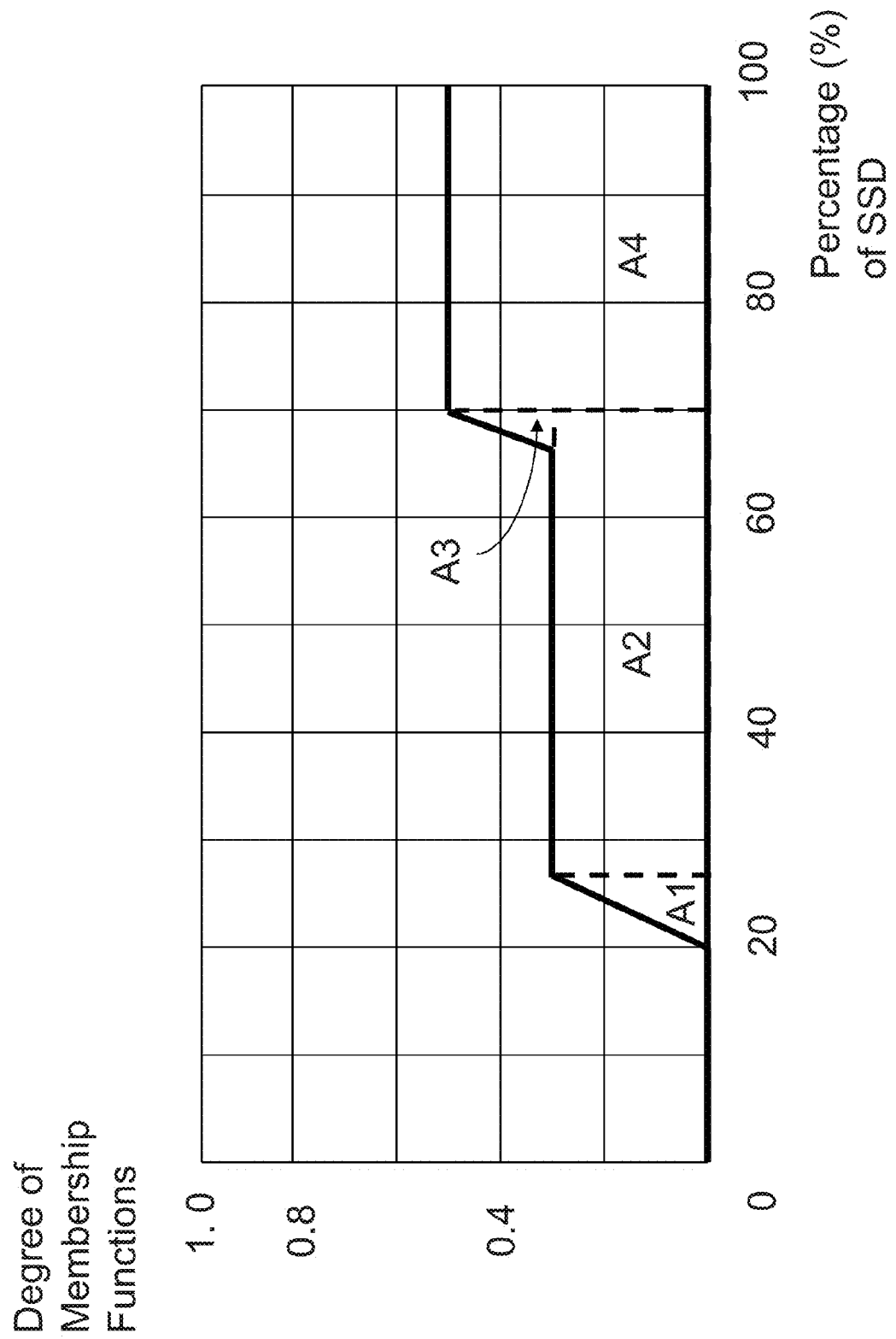
FIG. 8 describes the area with 4 dismantled sub-areas.

FIG. 5 illustrates membership functions for percentage of SSDs in the storage node 100 (the other portion is HDDs). The membership function describing the degree of percentage of SSDs at low level is 1.0 when the percentage of SSDs is greater than or equal to 0% but smaller than 20%, 1.0 descending to 0 linearly when the percentage of SSDs is greater than or equal to 20% but smaller than 40%, and 0 when the percentage of SSDs is greater than or equal to 40% but smaller than or equal to 100%. Similarly, the membership function describing the degree of percentage of SSDs at medium level is 0 when the percentage of SSDs is greater than or equal to 0% but smaller than 20%, 0 ascending to 1.0 linearly when the percentage of SSDs is greater than or equal to 20% but smaller than 40%, 1.0 when the percentage of SSDs is greater than or equal to 40% but smaller than 60%, 1.0 descending to 0 linearly when the percentage of SSDs is greater than or equal to 60% but smaller than 80%, and 0 when the percentage of SSDs is greater than or equal to 80% but smaller than or equal to 100%. The membership function describing the degree of percentage of SSDs at high level is 0 when the percentage of SSDs is greater than or equal to 0% but smaller than 60%, 0 ascending to 1.0 linearly when the percentage of SSDs is greater than or equal to 60% but smaller than 80%, and 1.0 when the percentage of SSDs is greater than or equal to 80% but smaller than or equal to 100%.

The fuzzy rule links one membership function for the performance parameter at one specified level to one membership function for the configuration of the storage devices at another specified level. They are shown in FIG. 6. Each rule links a membership function of IOPS and a membership function of throughput at a specified level, respectively, to a membership function of percentage of SSDs at one specified level. For example, rule 5 is for percentage of SSDs at medium level which is linked to IOPS at medium level and throughput at medium level. Rule 5 means if the membership function for IOPS is at medium level and the membership function of throughput is at medium level, the corresponding membership function applied is at the medium level one. Similarly, corresponding relationship can be found in FIG. 6 for all other fuzzy rules. Applications of the fuzzy rules will be described later.

The traffic forecasting module 160 is used to provide forecasted values of the performance parameters in a particular point in time in the future. For example, the traffic forecasting module can forecast the IOPS, latency, and throughput in ten minutes later based on analyzed historical data. Then, the performance parameters are provided to the fuzzy rule control module 180. The fuzzy rule control module 180 receives them and can do something ten minutes later. Of course, the traffic forecasting module 160 can forecast and provide the IOPS and throughput continuously. Methods or devices used by the traffic forecasting module 160 to provide forecasted values of the performance parameters are not limited by the present invention.

The fuzzy rule control module 180 arranges the configuration of the storage devices in the storage node 100 in the particular point in time in the future according to the fuzzy rules and the forecasted values. Thus, a specified value of one specified performance parameter can be achieved in the particular point in time in the future. In order to explain how the adaptive fuzzy rule controlling system 10 works, an example used in the present embodiment is illustrated below.

When the traffic forecasting module 160 predicts that the IOPS and throughput ten minutes later would be 70,000 and 7 GB/s, respectively, it will send these data to the adaptive neural fuzzy inference module 140. A fuzzy inference is used to obtain the configuration of the storage devices with at least one given performance parameter by the degrees defined by the membership functions. There are many inferences, such as Mamdani inference or Sugeno inference, can be used in the field of fuzzy logic. It is not limited by the present invention which one is used. Mamdani inference is used in the embodiment for illustration. Please see FIG. 3 again. When the IOPS is 70,000, two points, A and B can be found in the membership functions for medium level and high level, respectively. Thus, the corresponding degrees are 0.33 and 0.5, respectively. Similarly, in FIG. 4, when the throughput is 7 GB/s, two points, C and D can be found in the membership functions for medium level and high level, respectively. Thus, the corresponding degrees are 0.5 and 0.33, respectively.

Rule 5, rule 6, rule 8 and rule 9 are applied for the 4 points mentioned above. For example, for rule 5, if the membership function for IOPS is at medium level and that of throughput is at medium level, the membership function for the percentage of SSDs is at medium level. The degree of the percentage of SSDs is the minimum of the degrees for the IOPS and throughput. It is 0.33. Similarly, in rule 6, the degree for the percentage of SSDs is 0.33; in rule 8, the degree for the percentage of SSDs is 0.5; in rule 9, the degree for the percentage of SSDs is 0.33. By Mamdani inference, the control rule come from the fuzzy rules above can be obtained by calculating a centroid location of the cross-lined area from 0 of the horizontal axis in FIG. 7. In order to simplify the calculation for illustration, the calculations of centroid location can first divide the cross-lined area into 4 simple-shaped sub-areas, A1, A2, A3 and A4 in FIG. 8. The calculations in the adaptive neural fuzzy inference module 140 are listed in FIG. 9. The outputted control rule for the percentage of SSDs ten minutes is 66% SSDs (with 34% HDDs). After the later fuzzy rule control module 180 receives the percentage of SSDs, it can arrange the configuration for the storage node 100 for ten minutes later accordingly.

It should be noticed that the membership functions and associated fuzzy rules can be set according to operation experience of the SDS system or from the dynamic relationship. Namely, the membership functions and associated fuzzy rules come from a most suitable source that will lead to a good control of latency. The membership functions used are not linear in different segments. There can be other simulated relationship as long as the control rule would introduce better control over latency. Of course, the adaptive neural fuzzy inference module 140 can check a difference value between the specified value of latency and the observed value of latency from the traffic monitoring module 120. Once the difference value is over a tolerance value, the adaptive neural fuzzy inference module learns new fuzzy rules and membership functions. For example, if an allowed latency for the storage node 100 is 2 seconds and the tolerance value is 1 second, when the difference value is 2 seconds, the actual latency is 4 seconds. It is not accepted by the SLA. The current fuzzy rules and membership functions are not applied to the new status of the storage node 100. New fuzzy rules and membership functions have to be setup again from learning the new status in the storage node 100 and analyzing it. In the present embodiment, two of the performance parameters (throughput and IOPS) are linked to a configuration of storage devices (percentage of the SSDs). In Practice, one, two, or even all three performance parameters can be linked to a configuration of storage devices.

It should be emphasized that the storage devices are not limited to HDD and SSD. Random Access Memories (RAMs) can be used. Thus, a combination of HDDs and RAMs or SSD and RAMs are applicable. The configuration in the embodiment is percentages of different types of storage devices in use. It can be a fixed quantity of storage devices of single type in use (e.g., the storage node contains SSDs only and reconfiguration is done by adding new or standby SSD). Most important of all, the traffic monitoring module 120, adaptive neural fuzzy inference module 140, traffic forecasting module 160, or fuzzy rule control module 180 is hardware or software executing on at least one processor in the storage node 100.

While the invention has been described in terms of what is presently considered to be the most practical and preferred embodiment, it is to be understood that the invention needs not be limited to the disclosed embodiment. On the contrary, it is intended to cover various modifications and similar arrangements included within the spirit and scope of the appended claims, which are to be accorded with the broadest interpretation so as to encompass all such modifications and similar structures.

What is claimed is:

1. An adaptive fuzzy rule controlling system for a software defined storage (SDS) system to control performance parameters in a storage node, comprising:
a traffic monitoring module, for acquiring observed values of performance parameters in the storage node;
an adaptive neural fuzzy inference module, for learning a dynamic relationship between configurations of a plurality of storage devices in the storage node and the performance parameters during a period of time, and outputting fuzzy rules which is built according to the dynamic relationship;
a traffic forecasting module, for providing forecasted values of the performance parameters in a particular point in time in the future; and
a fuzzy rule control module, for arranging the configuration of the storage devices in the storage node in the particular point in time in the future according to the fuzzy rules and the forecasted values so that a specified value of one specified performance parameter can be achieved in the particular point in time in the future,
wherein the storage node is operated by SDS software.

2. The adaptive fuzzy rule controlling system according to claim 1, wherein the performance parameters comprise Input/output Operations Per Second (IOPS), latency, or throughput.

3. The adaptive fuzzy rule controlling system according to claim 1, wherein the adaptive neural fuzzy inference module generates a plurality of membership functions, each for defining degrees of one performance parameter or the configuration of the storage device at a specified level.

4. The adaptive fuzzy rule controlling system according to claim 3, wherein the fuzzy rule links one membership function fir the performance parameter at one specified level to one membership function for the configuration of the storage devices at another specified level.

5. The adaptive fuzzy rule controlling system according to claim 4, wherein a fuzzy inference is used to obtain the configuration of the storage devices with at least one given performance parameter by the degrees defined by the membership functions.

6. The adaptive fuzzy rule controlling system according to claim 5, wherein the fuzzy inference is Mamdani inference or Sugeno inference.

7. The adaptive fuzzy rule controlling system according to claim 1, wherein the adaptive neural fuzzy inference module further checks a difference value between the specified value of the specified performance parameter and the observed value of the specified performance parameter.

8. The adaptive fuzzy rule controlling system according to claim 7, wherein the adaptive neural fuzzy inference module learns new fuzzy rules and membership functions if the difference value is over a tolerance value.

9. The adaptive fuzzy rule controlling system according to claim 1, wherein the period of time ranges from tens of seconds to a period of the historical records.

10. The adaptive fuzzy rule controlling system according to claim 1, wherein the observed values in the period of time is not continuously recorded.

11. The adaptive fuzzy rule controlling system according to claim 1, wherein learning the dynamic relationship is achieved by Neural Network Algorithm.

12. The adaptive fuzzy rule controlling system according to claim 1, wherein the specified value is requested by a Service Level Agreement (SLA) or a Quality of Service (QoS) requirement.

13. The adaptive fuzzy rule controlling system according to claim 1, wherein the storage devices are Hard Disk Drives (HDDs), Solid State Drives, Random Access Memories (RAMs), or a mixture thereof.

14. The adaptive fuzzy rule controlling system according to claim 1, wherein the configuration is percentages of different types of storage devices or a fixed quantity of storage devices of single type in use.

15. The adaptive fuzzy rule controlling system according to claim 1, wherein the traffic monitoring module, adaptive neural fuzzy inference module, traffic forecasting module or fuzzy rule control module is hardware or software executing on at least one processor in the storage node.

* * * * *